US009389898B2

(12) United States Patent
Barak et al.

(10) Patent No.: US 9,389,898 B2
(45) Date of Patent: Jul. 12, 2016

(54) SYSTEM AND METHOD FOR ENFORCEMENT OF SECURITY CONTROLS ON VIRTUAL MACHINES THROUGHOUT LIFE CYCLE STATE CHANGES

(71) Applicants: Nir Barak, Karmi Yosef (IL); Amir Jerbi, Givatayim (IL); Eitan Hadar, Nesher (IL); Michael Kletskin, Matan (IL)

(72) Inventors: Nir Barak, Karmi Yosef (IL); Amir Jerbi, Givatayim (IL); Eitan Hadar, Nesher (IL); Michael Kletskin, Matan (IL)

(73) Assignee: CA, INC., New York, NY (US)

( * ) Notice: Subject to any disclaimer, the term of this patent is extended or adjusted under 35 U.S.C. 154(b) by 635 days.

(21) Appl. No.: 13/633,487

(22) Filed: Oct. 2, 2012

(65) Prior Publication Data
US 2014/0096134 A1 Apr. 3, 2014

(51) Int. Cl.
G06F 9/455 (2006.01)
G06F 21/55 (2013.01)
G06F 21/56 (2013.01)

(52) U.S. Cl.
CPC .......... *G06F 9/45558* (2013.01); *G06F 21/554* (2013.01); *G06F 21/566* (2013.01)

(58) Field of Classification Search
None
See application file for complete search history.

(56) References Cited

U.S. PATENT DOCUMENTS

| 4,969,092 | A | 11/1990 | Shorter |
| 4,991,089 | A | 2/1991 | Shorter |
| 5,095,427 | A | 3/1992 | Tanaka |
| 5,892,900 | A | 4/1999 | Ginter et al. |
| 6,496,847 | B1 | 12/2002 | Bugnion |
| 7,499,865 | B2 | 3/2009 | Aggarwal et al. |
| 7,802,251 | B2 | 9/2010 | Kitamura |
| 7,899,734 | B2 | 3/2011 | Ausubel et al. |
| 7,961,722 | B1 | 6/2011 | Jankowski |
| 7,962,950 | B2 | 6/2011 | Choo |
| 8,201,237 | B1 | 6/2012 | Doane |
| 8,443,440 | B2 | 5/2013 | McGee |
| 8,484,732 | B1 | 7/2013 | Chen |
| 8,528,070 | B2 | 9/2013 | Stiekes |
| 8,538,919 | B1 | 9/2013 | Nielsen |
| 8,875,240 | B2 * | 10/2014 | Spiers et al. ....................... 726/3 |
| 2004/0133516 | A1 | 7/2004 | Buchanan et al. |
| 2004/0236589 | A1 | 11/2004 | Takahashi |
| 2004/0249762 | A1 | 12/2004 | Garibay et al. |
| 2005/0097534 | A1 | 5/2005 | Clement |
| 2005/0183143 | A1 | 8/2005 | Anderholm |
| 2006/0143359 | A1 | 6/2006 | Dostert |
| 2006/0282393 | A1 | 12/2006 | Sladek et al. |

(Continued)

OTHER PUBLICATIONS

Notice of Allowance as issued for U.S. Appl. No. 13/633,454, dated Nov. 29, 2013.

(Continued)

*Primary Examiner* — Kenneth Tang
(74) *Attorney, Agent, or Firm* — Pillsbury Winthrop Shaw Pittman LLP

(57) ABSTRACT

Systems and methods associated with virtual machine security are described herein. One example method includes instantiating a guest virtual machine in a virtual computing environment. The method also includes installing a life cycle agent on the guest virtual machine, assigning an identifying certificate, a set of policies, and an encryption key to the guest virtual machine, and providing the certificate, policies, and encryption key to the guest virtual machine. The certificate, policies, and encryption key may then be used by the guest virtual machine to authenticate itself within the virtual computing environment and to protect data stored on the guest virtual machine.

38 Claims, 3 Drawing Sheets

(56) References Cited

U.S. PATENT DOCUMENTS

| | | |
|---|---|---|
| 2007/0106992 A1 | 5/2007 | Kitamura |
| 2007/0204153 A1 | 8/2007 | Tome |
| 2008/0086726 A1 | 4/2008 | Griffith |
| 2008/0163211 A1 | 7/2008 | Mizuno |
| 2008/0184225 A1* | 7/2008 | Fitzgerald et al. ............... 718/1 |
| 2008/0256533 A1 | 10/2008 | Ben-Yehuda |
| 2008/0271015 A1 | 10/2008 | Ibrahim |
| 2009/0013149 A1 | 1/2009 | Uhlig |
| 2009/0198809 A1 | 8/2009 | Goto |
| 2009/0293056 A1 | 11/2009 | Ferris |
| 2009/0300607 A1 | 12/2009 | Ferris |
| 2009/0307705 A1 | 12/2009 | Bogner |
| 2010/0031339 A1 | 2/2010 | Minnen |
| 2010/0042720 A1 | 2/2010 | Stienhans |
| 2010/0125664 A1 | 5/2010 | Hadar |
| 2010/0125902 A1 | 5/2010 | Killian |
| 2010/0132016 A1 | 5/2010 | Ferris |
| 2010/0198972 A1 | 8/2010 | Umbehocker |
| 2010/0199037 A1 | 8/2010 | Umbehocker |
| 2010/0205304 A1 | 8/2010 | Chaturvedi |
| 2010/0287280 A1 | 11/2010 | Sivan |
| 2010/0299366 A1 | 11/2010 | Stienhans |
| 2010/0306463 A1 | 12/2010 | Nakamura |
| 2010/0325628 A1 | 12/2010 | Haga |
| 2011/0022574 A1 | 1/2011 | Hansen |
| 2011/0047543 A1 | 2/2011 | Mohinder |
| 2011/0055378 A1 | 3/2011 | Ferris |
| 2011/0055714 A1 | 3/2011 | Vemulapalli |
| 2011/0072486 A1* | 3/2011 | Hadar et al. ............... 726/1 |
| 2011/0072487 A1 | 3/2011 | Hadar |
| 2011/0106917 A1 | 5/2011 | Park et al. |
| 2011/0126197 A1 | 5/2011 | Larsen |
| 2011/0138047 A1 | 6/2011 | Brown |
| 2011/0142053 A1 | 6/2011 | Van Der Merwe |
| 2011/0154448 A1 | 6/2011 | Oida et al. |
| 2011/0197065 A1 | 8/2011 | Stauth |
| 2011/0225582 A1 | 9/2011 | Iikura |
| 2012/0042061 A1 | 2/2012 | Ayala |
| 2012/0054486 A1 | 3/2012 | Lakkavalli |
| 2012/0060031 A1 | 3/2012 | Huang et al. |
| 2012/0144005 A1 | 6/2012 | Quintard |
| 2012/0159469 A1 | 6/2012 | Laor |
| 2012/0179904 A1 | 7/2012 | Dunn |
| 2013/0061222 A1* | 3/2013 | Hwang et al. ............... 718/1 |
| 2013/0097296 A1 | 4/2013 | Gehrmann |
| 2013/0124353 A1 | 5/2013 | Dhoolia et al. |
| 2013/0263208 A1 | 10/2013 | Challa |
| 2014/0006776 A1 | 1/2014 | Scott-Nash |

OTHER PUBLICATIONS

Final Office Action as issued for U.S. Appl. No. 13/406,088, dated Feb. 12, 2014.
Final Office Action issued for U.S. Appl. No. 13/405,973, dated Sep. 23, 2013.
Non-Final Office Action issued for U.S. Appl. No. 13/406,088, dated Oct. 7, 2013.
U.S. Appl. No. 13/405,973, filed Feb. 27, 2012, Barak et al.
U.S. Appl. No. 13/406,088, filed Feb. 27, 2012, Weinstein et al.
U.S. Appl. No. 13/406,036, filed Feb. 27, 2012, Barak et al.
U.S. Appl. No. 13/633,454, filed Oct. 2, 2012, Korthny et al.
Non-Final Office Action issued for U.S. Appl. No. 13/405,973, dated Apr. 1, 2013.
Office Action issued for U.S. Appl. No. 14/213,881 dated Jul. 16, 2014.
Final Office Action issued fo U.S. Appl. No. 14/213,881 dated Nov. 19, 2014.
Notice of Allowance issued for U.S. Appl. No. 14/213,881, dated Dec. 3, 2014.
Final Office Action as issued in U.S. Appl. No. 13/406,036, dated Oct. 19, 2015.
Non-Final Office Action issued in U.S. Appl. No. 13/406,036, dated Apr. 13, 2015.

* cited by examiner

SYSTEM AND METHOD FOR ENFORCEMENT OF SECURITY CONTROLS ON VIRTUAL MACHINES THROUGHOUT LIFE CYCLE STATE CHANGES

BACKGROUND

Cloud computing environments have revolutionized the manner in which business organizations examine the requirements and capacity to implement their data processing needs. A cloud computing environment may allow a cloud provider to host hardware and related items and provide systems and computational power as a service to a customer or other user (e.g., individual consumers, business organizations, or other entities). Thus, when implementing data processing needs via a cloud vendor, a user may not bear the cost of space, energy, and maintenance in order to acquire computational resources.

BRIEF SUMMARY

Systems and methods for providing enforcement of security controls on virtual machines throughout life cycle state changes are described herein. In one example, a life cycle manager component in a cloud environment in concert with local life cycle agents on virtual machines in the cloud environment may enable security controls throughout numerous virtual machine life cycle states. For example, a virtual machine may be in "inactive" state during preparation and setup. In the inactive state, the virtual machine may contain the operating system and applications but not sensitive data. However, protection may still be warranted and therefore provided by the life cycle manager component.

A virtual machine may be moved to an "active" state by the life cycle manager component when a user desires to start using the virtual machine. When a user activates a virtual machine, the user may supply authentication credentials. The life cycle manager component may validate the authentication credentials and whether the virtual machine is allowed to be activated. If the life cycle manager determines that the credentials are invalid or that the virtual machine is not allowed to be activated, the life cycle manager may prevent activation of the virtual machine. Otherwise, the life cycle manager may allow the virtual machine to be activated.

After the virtual machine is activated, the life cycle manager component may enforce security policies on the virtual machines. In one example, the life cycle manager may enforce security policies by installing a life cycle agent on the virtual machine. The life cycle agent may facilitate encryption of sensitive data, monitoring virtual machine integrity, and monitoring resource access. Furthermore, creating a copy of the virtual machine may cause the copy to attempt to activate itself by contacting the life cycle manager component. If this activation is restricted by the system based on defined policies this new activation may be prevented by the life cycle manager and thus the sensitive data on the virtual machine may be protected.

If the life cycle manager detects deviations in a policy (e.g., a security policy) associated with a virtual machine, the virtual machine may be moved to an "out of sync" state by the life cycle manager component. This may occur if virtual machine data is tampered with (e.g., while the virtual machine is offline and an active security agent is unable to protect the virtual machine) or if the life cycle manager detects that a policy associated with a virtual machine is missing or inconsistent with policies stored on the life cycle manager. When in this "out of sync" state, the life cycle manager component may detach the virtual machine from the network and only allow the virtual machine to communicate with the life cycle manager component. The life cycle manager component may then attempt to resolve these identified deviations by reverting the virtual machine to a previously stored "in sync" state or by attempting to correct the detected inconsistencies by updating the policies of the virtual machine. After deviations are resolved, the virtual machine may be moved back to an "active" state by the life cycle manager.

A virtual machine may be moved to a "locked" state by the life cycle manager component if a user requests the virtual machine be locked (e.g. when user is going on vacation and would not want to use virtual machine for a long period of time). When in this "locked" state, the life cycle manager component may prevent startup of the virtual machine. In order to restore the virtual machine back into the "active" state, the user may have to request that the virtual machine be unlocked and reactivated (see "active state" description provided herein).

A virtual machine may be moved to a "disposed" state by the life cycle manager component when a user requests to dispose of the virtual machine (e.g. user is done working with virtual machine and does not need it anymore). A disposed virtual machine may not be able to be started. Even if a user tries to load an old backup or snapshot of the disposed virtual machine, the life cycle manager component may prevent activation of the disposed virtual machine. Thus, the life cycle manager component may ensure that disposed virtual machines cannot be activated again and potentially used for an improper purpose.

In addition to security controls enforced throughout virtual machine life cycle states described above, the life cycle manager component may trigger and enforce security controls and checks on various virtual machine activities. For example, when the virtual machine is started (e.g., a "running" activity), the life cycle manager component may check whether the virtual machine is allowed to run based on its activation state (e.g., a "disposed" virtual machine may not be allowed to run by the life cycle manager component). When the virtual machine is moved to another host (e.g., a "moving" activity), the life cycle manager component may check that virtual machine integrity is maintained and may ensure that the virtual machine is moved to an authorized environment. Otherwise, the life cycle manager component may prevent the virtual machine from starting or move the virtual machine to an "out of sync" state.

When the virtual machine is cloned (e.g., a "cloning" activity), the life cycle manager component may check that virtual machine integrity is maintained, that the virtual machine is cloned to an authorized environment, and that the virtual machine does not break any usage policies (e.g., a usage policy may define that only one instance of the virtual machine is allowed to be running). If prevented by a usage policy, a user, an administrator, or some other entity, the life cycle manager may prevent the cloning of the virtual machine. Alternatively, the life cycle manager component may move the cloned virtual machine to an "out of sync" state or allow the virtual machine to be cloned but refuse to allow the cloned virtual machine to run.

When the virtual machine is loaded from a previous snapshot, the life cycle manager component may validate whether virtual machine integrity is maintained and whether the virtual machine's current state is allowed to operate.

These systems and methods, as a result of improving the security of virtual machines, may also allow businesses to promote their strong security policies. For example, for compliance and regulation purposes, an infrastructure as a service (IaaS) provider may be able to demonstrate a strong security policy that prevents intentional or un-intentional misuse of virtual machines and sensitive data stored thereon by non-authorized users. Accordingly, the systems and methods provided herein may increase trust, compliance, regulation, and control for customers' sensitive data.

It is to be understood that both the foregoing general description and the following detailed description are exemplary and not restrictive of the scope of the invention.

DETAILED DESCRIPTION

Figure 1:
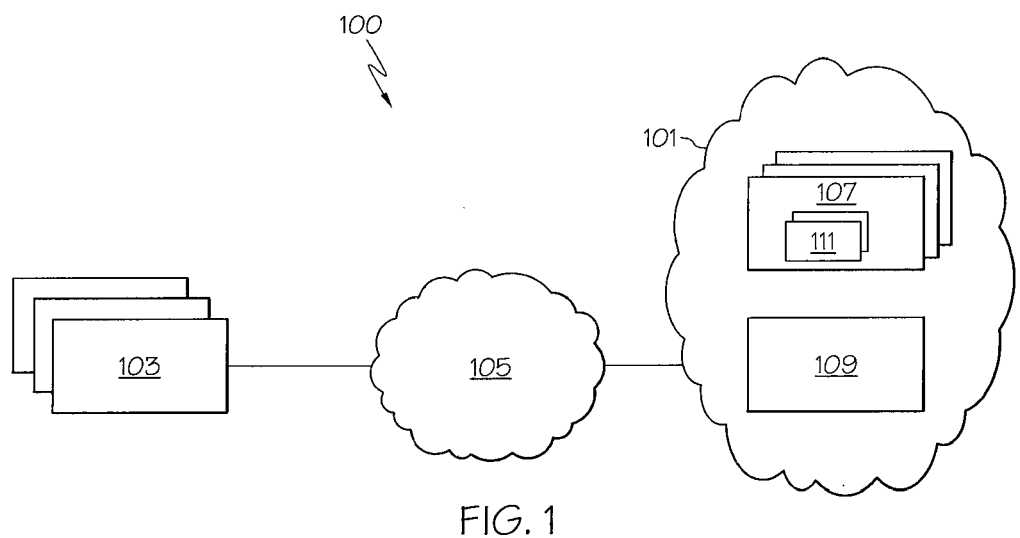
FIG. 1 is an illustration of an example environment for providing enforcement of security controls in a cloud computing environment throughout virtual machine life cycle state changes, according to various implementations.

Because users are placing their sensitive data in the hands of cloud environment providers, the security of user data in the cloud environment is a significant concern. For example, cloud provider administrators sometimes have full privileges on virtual machines in their cloud environments. These privileges can be used to access sensitive data by accessing the virtual machines themselves. This vulnerability may persist even when a virtual machine is disposed of. Additionally, unlike traditional security controls over non-virtualized systems, virtual machines deployed in a cloud environment may be tampered with during image state change situations. For example, when a virtual machine moves between hosts, there may be a need to ensure data was not changed between the source and the target, as the virtual machine data is sometimes vulnerable in the transition. Similarly, when a virtual machine has been temporarily shut down, the virtual machine's data may be changed even though the virtual machine is offline because virtual machine disks can be mounted and modified even during a non-active state.

Accordingly, consistent security control throughout a virtual image's life cycle is a desirable goal. Customers seek assurances of adequate security throughout the states and transitions of virtual machines when deployed in a cloud environment.

The systems and methods provided herein may enable continued security control over a virtual machine deployed in a cloud environment throughout the life cycle of the virtual machine. For example, access to sensitive data associated with the virtual machine may be prevented by encrypting and decrypting the sensitive virtual machine data at runtime. Thus, the data may be in a decrypted state while the virtual machine is running and in an encrypted state while the virtual machine is offline. This may prevent access to data on the virtual machine even if someone is able to steal a virtual machine and copy it into a private environment.

In another example, use of the virtual machine may be prevented outside its defined physical boundaries. Thus, a virtual machine may not operate on untrusted environments because virtual machines may be prevented from starting when loaded on an untrusted environment. Therefore, blocking activation of virtual machines on untrusted environments may facilitate use control that prevents an attacker from copying a virtual machine image to a different environment and trying to break into the virtual machine image. Furthermore, copies of a virtual machine may also be prohibited by the certified cloud environment without user authorization. Consequently, attacks are performed on an active virtual machine which may be monitored by active security processes. As such, attacks may be detectable and preventable by conventional active security processes, such as an access control agent.

Systems and methods disclosed herein may also limit virtual machine usage to allowed time spans by preventing a virtual machine from running if the virtual machine is marked as inactive. Virtual machine integrity monitoring may also be provided for, and if an integrity violation is detected, the virtual machine may be reverted to a trusted snapshot. Disclosed systems and methods may also protect against theft and impersonation by preventing copies of virtual machines from starting. This may also prevent a virtual machine from being modified and planted back into the cloud environment as an impersonating machine to collect user data (e.g., by planting Trojans or other malware inside a protected network).

Furthermore, security controls may be enforced when a virtual machine is online (i.e., active and responsive) and offline (i.e., dormant and not responsive) and when deployed on premise (on its original cloud environment) and off premise (outside its original cloud environment). Additionally, the life cycle of a virtual machine may include transitions between various life cycle states such as, for example, a setup state, an activation state, a use state, a start action state, a suspend action state, a stop action state, a move action state, an end of use (i.e., disposal) state, and other life cycle states. Because the systems and methods provided herein may detect state changes in the life cycle of a virtual machine, security controls may be employed consistently over the virtual machine throughout its life cycle. Systems and methods disclosed herein may also enable other security controls in addition to those described.

Accordingly, the systems and methods provided herein may facilitate enforcement of security controls from virtual machine setup throughout the virtual machine's life cycle, while insuring proper security controls before, during, and after state transitions. The protection enforcement may be continuous and active as active policies are monitored. If a security level differs from what was originally defined for a virtual machine, the virtual machine may be locked until the system restores the virtual machine to an appropriate policy level.

FIG. 1 illustrates an environment 100, which is an example of an environment wherein a system may reside for providing enforcement of security controls in a cloud computing environment throughout virtual machine life cycle state changes. In some implementations, environment 100 may include a cloud environment 101, one or more user devices 103, a network 105, and/or other elements.

In some implementations, cloud environment 101 may be or include a virtualized computing environment wherein one or more services 111 are provided to one or more users at one or more user devices 103 over network 105. In some implementations, cloud environment 101 may support one or more virtual machines 107 that provide the one or more services 111 to users accessing cloud environment 101.

In some implementations, cloud environment 101 may also include a virtual appliance machine 109 that may provide one or more security enforcement features, control features, support features, and/or other features to one or more virtual machines 107 of cloud environment 101. A person having ordinary skill in the art will recognize that there may be multiple virtual appliance machines 109 for redundancy, load balancing, and/or other purposes, and that the virtual appliance machine 109 may operate outside the cloud environment 101 or through a proxy.

As discussed above, services 111 may be provided to consumers/users (operating one or more user devices 103) via virtual guest machines 107. Services 111 provided by an individual guest virtual machine 107 may be customized according to the needs of a given user such that a bundle or suite of applications or other services 111 may be provided to a user by a given guest virtual machine 107 and/or such that a given customized instance of an application 111 may be provided to a user by a given guest virtual machine 107 or by several guest virtual machines. Furthermore, guest virtual machine 107 may provide applications, media, data, or other services 111 that a user has loaded onto guest virtual machine 107. Accordingly, guest virtual machine 107 may provide storage and/or processing services to a user.

Virtual machines, including guest virtual machine 107 and virtual appliance machine 109, may also be referred to as "images" that reside or are supported by a cloud or other virtualized computing environment (e.g., cloud environment 101). As used herein, the term "virtual machine" or "image" (e.g., guest virtual machine 107, virtual appliance machine 109) refers to a logically defined computing machine (as opposed to a physically defined computing machine) that may be identified by one or more logical characteristics (e.g., addresses, ports, names, locations, etc.) but which in reality is composed of or supported by a static or dynamic set of one or more physical computing devices providing memory, processing power, or other computing features. A virtual machine is essentially an emulation of computing hardware (physical computing devices), wherein software is used to provide a computing environment that looks to users as a physical machine so that users can utilize the storage and/or processing capabilities thereof. Accordingly, the actions performed by virtual machines described herein, including virtual appliance machine 109 and guest virtual machine 107, may be performed using one or more processing devices (e.g., microprocessors) of one or more physical computing machines supporting the virtual computing environment. Similarly, any data storage needs or actions relating thereto may be provided or facilitated by the memory devices (e.g., RAM, hard disc, EEPROM, flash memory, etc.) of one or more physical computing machines supporting the virtual computing environment. Furthermore, the term "cloud computing" or "cloud computing environment," may refer to a virtual computing environment supporting one or more virtual machines.

As described herein, applications/services 111 are provided to a user via guest virtual machine 107. As guest virtual machine 107 may be virtual in nature, the ability to control and/or limit its use is different from that of physical machines. Accordingly, as described herein, virtual appliance machine 109 provides for control of certain aspects of guest virtual machine 107 within cloud environment 101.

In some implementations, a specific guest virtual machine 107 may be provided for the specific use of a user, or group of users. Through guest virtual machine 107, a user may utilize or interact with the one or more services 111 hosted thereon. As discussed above, in some implementations, guest virtual machine 107 may be provided with one or more applications or services 111 installed thereon. In some implementations, a user may install one or more applications/services 111 onto guest virtual machine 107 provided by a provider of cloud environment 101. In some implementations, a user may access one or more services 111 located elsewhere on cloud environment 101 or elsewhere through guest virtual machine 107.

In some implementations, a user may interact with guest virtual machine 107 via one or more of user devices 103. For example, a user device 103 may connect to cloud environment 101 via network 105 and therefore be provided with access to guest virtual machine 107 that provides one or more services 111. In some implementations, user devices 103 may be or include one or more servers, desktop computers, laptop computers, tablet computers, hand-held computers, smart phones, cellular phones, personal digital assistants (PDAs), and/or other computing devices.

Network 105 may be or include the Internet and/or the World Wide Web ("www"). In some implementations, network 105 may be or include a switching fabric that is part of a Wide Area Network (WAN), a Local Area Network (LAN), and/or other types of networks known to those of ordinary skill in the art (e.g., a TCP/IP network). In some implementations, network 105 routes requests and/or other communication between cloud environment 101 and user devices 103. In some implementations, network 105 may use or include wired, wireless, optical, or other types of communication links.

Figure 3:
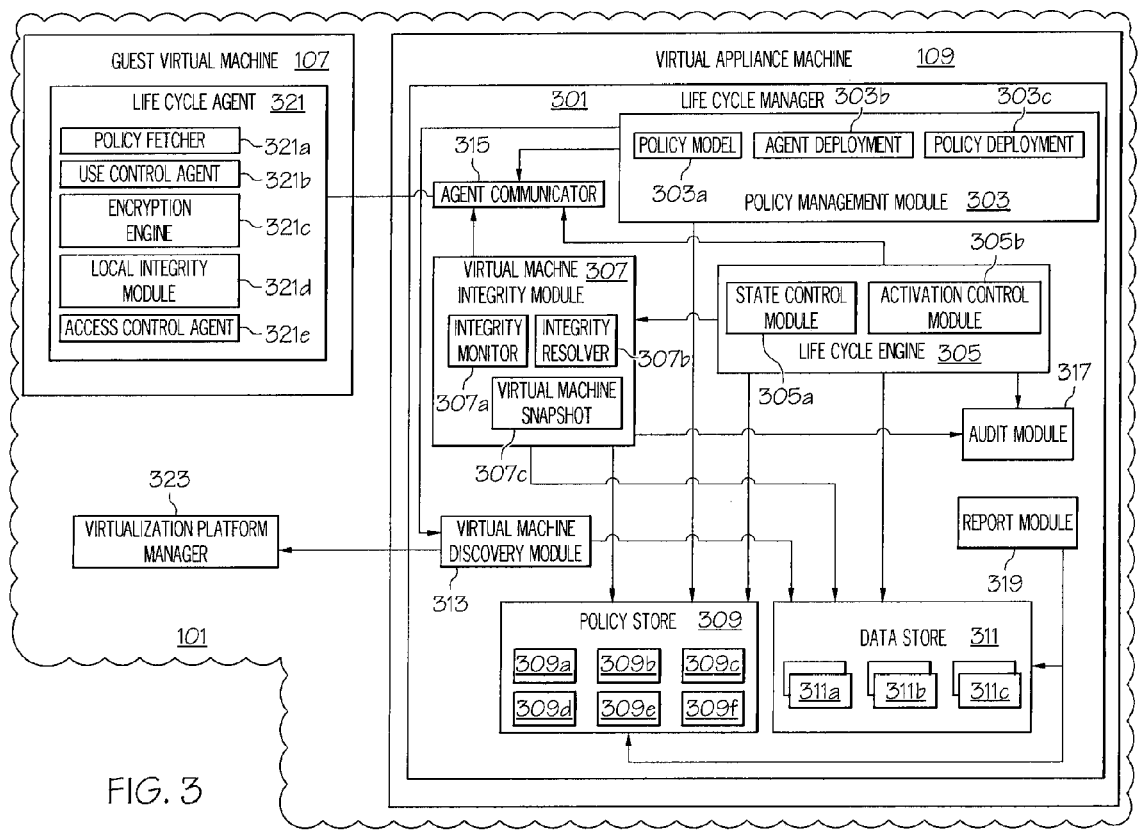
FIG. 3 is an illustration of an example system for providing enforcement of security controls in a cloud computing environment throughout virtual machine life cycle state changes, according to various implementations.

FIG. 3 illustrates an example of constituent components of cloud environment 101 that may be used in the systems and methods provided herein (including virtual appliance machine 109 and guest virtual machine 107) to provide enforcement of security controls throughout virtual machine life cycle and state transition changes. For example, in some implementations, virtual appliance machine 109 or other governance-related component of cloud environment 101 (e.g., a hypervisor or other physical machine) may include one or more applications, agents, and/or modules that assist or perform enforcement of security controls throughout virtual machine life cycle and state transition changes. For example, in some implementations, a virtual appliance machine 109 may include a life cycle manager 301. Life cycle manager 301 may be an agent that is in charge of monitoring the life cycle (i.e., current state) of guest virtual machine 107 in cloud environment 101 as well as monitoring the integrity and enforcement of security policies on guest virtual machine 107. Life cycle manager 301 may receive from guest virtual machine 107 (e.g., a life cycle agent 321 on guest virtual machine 107), data regarding usage, state and integrity as described herein. Life cycle manager 301 may use this data regarding guest virtual machine 107 to validate whether guest virtual machine 107 is aligned with a predefined policies assigned to guest virtual machine 107. As a result of the validation operation, life cycle manager 301 may also act to resolve any discrepancies when they are encountered. In some implementations virtual appliance machine 109 may generate audit event reports and alerts associated with state changes for guest virtual machine 107 and/or deviations from the predefined security policy. An audit event may be a security event associated with guest virtual machine 107. For example, an audit event may occur when someone attempts to start guest virtual machine 107, when someone attempts to copy guest virtual machine 107, when a policy deviation is detected on guest virtual machine 107, when an integrity issue has been detected regarding guest virtual machine 107, when sensitive data associated with guest virtual machine 107 has been modified, and so forth.

Life cycle manager 301 may include one or more sub-agents or sub-modules that perform or assist in performing one or more of the features and functions of life cycle manager 301. For example, in some implementations, life cycle manager 301 may include a policy management module 303. Policy management module 303 may manage the policies associated with guest virtual machine 107. In some implementations, policy management module 303 may provide an interface for administrators or other entities to define and/or edit policies for guest virtual machine 107. Policy management module 303 may also deploy a policy onto guest virtual machine 107 when one is not already deployed or when an updated or alternative security policy is deployed. For example, after guest virtual machine 107 has its life cycle agent 321 installed and setup thereon, policy management module 303 may push a policy to life cycle agent 321.

In some implementations, in addition to an interface for defining and editing policies, policy management module 303 may include one or more policy models 303a which provide templates or frameworks for creating and modifying policies to be enforced on guest virtual machine 107. Policy management module 303 may also include an agent deployment module 303b, which actively deploys life cycle agent 321 on guest virtual machine 107. Policy management module 301 may also include a policy deployment module 303c, which actively deploys policies to life cycle agent 321 on guest virtual machine 107.

In some implementations, life cycle manager 301 may include a life cycle engine 305 that monitors activity and usage of virtual machines and thus, life cycle engine 305 may detect state and life cycle changes in guest virtual machine 107. The state and life cycle changes may be detected by the life cycle engine 305 based on data the life cycle engine 305 receives from life cycle agent 321. When it is determined that guest virtual machine 107's state has changed, life cycle engine 305 may validate whether the state change is compliant with security policies associated with guest virtual machine 107. If the state change is not compliant with the associated policy, life cycle engine 305 may notify the life cycle agent 321 on guest virtual machine 107, which in turn may prevent usage of guest virtual machine 107 so as to protect the data thereon. A state change of guest virtual machine 107 that is not compliant with an associated policy may also lead to life cycle engine 305 issuing an alert that may be communicated to one or more administrators, a user of guest virtual machine 107, or used for one or more reports or for other purposes.

By way of illustration, life cycle agent 321 may detect a modification of a security policy stored on guest virtual machine 107. Life cycle agent 321 may then communicate the change to the life cycle engine 305. Life cycle engine 305 may then compare the modified policy to a policy associated with guest virtual machine 107. If the modified policy is determined to be noncompliant, life cycle engine 305 may send a signal to the life cycle agent 321 instructing the life cycle agent to move guest virtual machine 107 into an out of sync state after which measures may be taken to revert guest virtual machine 107 to a state with a compliant security policy.

In some implementations, life cycle engine 305 may include a state control module 305a which may perform actual monitoring of guest virtual machine 107's state. The monitoring may be based on data received by the state control module 305a from the life cycle agent 321. This data may include, for example, a state life cycle agent 321 believes guest virtual machine 305 is in, a detected state change such as starting, stopping, going into sync, going out of sync, and so forth, policies stored on guest virtual machine 107, and so forth. State control module 305a may also compare the monitored state of guest virtual machine 107 against applicable policies (i.e., those applied to the guest virtual machine 107 such as a usage policy) to determine if a violation of any of the policies has occurred. Life cycle engine 305 may also include an activation control module 305b, which may monitor activation and reactivation events for guest virtual machine 107. Such events provide information regarding the life cycle state of guest virtual machine 107. For example, an activation event may indicate that guest virtual machine 107 has transitioned from an inactive state to an active state. An activation event may also indicate that guest virtual machine 107 is able to be used by a user and therefore certain security policy components may be relevant during this state. Similarly, reactivation events may be used to indicate state changes (i.e., from inactive to active) and may be used to apply appropriate security protocol components to guest virtual machine 107.

In some implementations, life cycle manager 301 may include a virtual machine integrity module 307, which may monitor and validate whether virtual machine data is compliant with integrity policies. If the integrity of guest virtual machine 107 is noncompliant, virtual machine integrity module 307 may issue alert to notify the appropriate entities (e.g., a user, an administrator of cloud environment 101, etc.). Integrity of a guest virtual machine 107 may be based, for example, on a signature of a sensitive file, whether unauthorized applications or data are present in the guest virtual machine 107, the state of the guest virtual machine 107, and so forth. Furthermore, virtual machine integrity module 307 may attempt to return the guest virtual machine 107 to a compliant state by taking one or more remedial measures such as, for example, reverting guest virtual machine 107 to a previously saved snapshot, modifying data to meet integrity policies, and so forth.

In some implementations, virtual machine integrity module 307 may include an integrity monitor 307a which monitors data of guest virtual machine 107 and compares the data to integrity policies. In some implementations, virtual machine integrity module 307 may include an integrity resolver 307b which may attempt to resolve violations of integrity policies by taking a remedial action such as, for example, reverting guest virtual machine 107 to a previously saved snapshot, modifying data associated with guest virtual machine 107, and so forth. In some implementations, virtual machine integrity module 307 may include a virtual machine snapshot 307c, which may save historical snapshot information of guest virtual machine 107. This snapshot or a portion of the information therein may be used to recover a portion of guest virtual machine 107 in the event that an integrity violation is identified.

In some implementations, life cycle manager 301 may include a policy store 309 which may store policies used for life cycle management of guest virtual machine 107. For example, in some implementations, policy store 309 may include virtual machine usage policies 309a which may define whether guest virtual machine 107 can be active, how many copies of guest virtual machine 107 are allowed to exist, how to react in case there is a violation of the usage policy 309a, and so forth. In some implementations, policy store 309 may also store integrity policies 309b that define what data should exist on guest virtual machine 107, data checksums that describe a signature of sensitive data and programs to facilitate detection of modifications to the data and programs, what remedial measures should be taken in case of an integrity violation, and other instructions or parameters. In some implementations, policy store 309 may include one or more security policies 309c that define what is classified as sensitive data (and/or gradations of sensitive data) on guest virtual machine 107, who can access sensitive data, through which channels sensitive data can be accessed, and/or other instructions or parameters. In some implementations, policy store 309 may include repair policies 309d that define how to repair guest virtual machine 107 in the event that an integrity flaw is identified. In some implementations, policy store 309 may include encryption policies 309e that define sensitive data that should be encrypted. This may prevent a user from accessing the encrypted data without the appropriate decryption key, despite otherwise being allowed by a security policy 309c to access the encrypted data. In some implementations, policy store 309 may include snapshot policies 309f. A snapshot policy 309f may define one or more snapshots of a prior state of guest virtual machine 107 to which guest virtual machine 107 may be restored in the event that the integrity of guest virtual machine 107 has been compromised.

In some implementations, life cycle manager 301 may include a data store 311 which may store data that controls operation of life cycle manager 301. Data store 311 may store, for example, virtual machine data 311a from guest virtual machine 107. Virtual machine data 311a may include snapshots of guest virtual machine 107, sensitive data signatures, a set of authorized programs, data that may facilitate integrity checks, data that may facilitate repairing or restoring guest virtual machine 107 in the event of an integrity compromise, and so forth. Data store 311 may also store virtual machine state data 311b relating to the life cycle state of guest virtual machine 107, certificate data 311c relating to a certificate associated with guest virtual machine 107, and so forth.

In some implementations, life cycle manager 301 may include a virtual machine discovery module 313. Discovery module 313 may discover when guest virtual machine 107 deployed in cloud environment 101 and monitor its state changes.

In some implementations, life cycle manager 301 may include an agent communicator module 315. Agent communicator module 315 may facilitate communication between life cycle agent 321 and life cycle manager 301. Thus, upon receiving information from life cycle agent 321, agent communicator 315 may route the information to an appropriate module on life cycle manager 301 (e.g., virtual machine integrity module 307), and then direct any response from the module back to life cycle agent 321. By way of illustration, if life cycle agent 321 sends a signal to life cycle manager 301 indicating that a user has modified a security policy on guest virtual machine 107, the signal may be received by agent communicator 315. Agent communicator 315 may in turn route the signal to virtual machine integrity module 307 which may determine whether the modification of the security policy is proper. Virtual machine integrity module 307 may then provide a response back to agent communicator 315 which may forward the response back to life cycle agent 321. In one example, the response may tell the life cycle agent 321 that no action is necessary if the change to the security policy is found to be permissible by virtual machine integrity module 307. In another example, the response may tell the life cycle agent 321 to take some remedial action (e.g., prevent the change, revert the change, shut down, restore to a prior version) if the change to the security policy is not permitted.

In some implementations, life cycle manager 301 may include an audit module 317. Audit module 317 may generate audit information according to an audit policy based on events associated with guest virtual machine 107. In one example, audit information may be generated any time permission to perform an action (e.g., start up, modify a security policy) is requested by guest virtual machine 107. In another example, audit information may be generated when permission to perform an action is denied by life cycle manager 301 or a component thereof. Audit information may be used, for example, by an administrator to evaluate whether a security breach has occurred with respect to guest virtual machine 107.

In some implementations, life cycle manager 301 may include a report module 319. Report module 319 may generate reports describing a status of the cloud environment 101. The reports may describe, for example, a status of a guest virtual machine 107 in cloud environment 101, a list of active and/or inactive guest virtual machines, a list of guest virtual machines that are out of sync, a list of guest virtual machines that have been recovered from an out of sync state, a compilation of data associated with alerts, and so forth.

In some implementations, guest virtual machine 107 may include a life cycle agent 321. Life cycle agent 321 may serve as a local enforcement point for guest virtual machine 107. Serving as a local enforcement point may include intercepting and authorization of data access attempts and/or command execution on guest virtual machine 107. In some implementations a life cycle agent 321 may be installed on all guest virtual machines a cloud environment 101. Life cycle agents 321 installed on such guest virtual machines may be managed and/or may interact with a life cycle manager 301 to provide comprehensive life cycle management of the guest virtual machines in the cloud environment 101. Life cycle agent 321 may download policies from life cycle manager 301 and then apply them on its respective guest virtual machine. Life cycle agent 321 may send local integrity and use control data to life cycle manager 301 and act according to decisions it receives from life cycle manager 301. For example, life cycle agent 321 may shutdown guest virtual machine 107 in the event that life cycle manager 301 decides that guest virtual machine 107 should not run. In some instances, life cycle agent 321 can resolve a deviation from a protection policy in the event that life cycle manager 301 finds or determines an integrity flaw in guest virtual machine 107 and would like to resolve it. An integrity flaw may include, for example, a file that should not exist on the disk, an unauthorized program running on guest virtual machine 107, a sensitive file having an altered signature, and so forth. Life cycle agent 321 may also download encryption policies from life cycle manager 301 (e.g., from policy deployment module 303c). Furthermore, life cycle agent 321, using an encryption policy, may encrypt local data marked as sensitive by life cycle manager 301 (e.g., according to a security policy 309c). In some implementations, encryption and decryption may be performed at run-time, meaning that when sensitive data is read from the disk of guest virtual machine 107, life cycle agent 321 may decrypt the data, and that when sensitive data is written to the disk of guest virtual machine 107, the data may be encrypted by life cycle agent 321.

In some implementations, life cycle agent 321 may include one or more sub modules or sub components. For example, life cycle agent 321 may include a policy fetcher 321a, which may receive policies from life cycle manager 301 (e.g., may download policies 309a-309f or other policies from policy deployment module 303c).

In some implementations, life cycle agent 321 may include a use control agent 321b, which may enable or disable use of guest virtual machine 107 based on whether a decision has been made from life cycle manager 301 to enable or disable use. Use control agent 321b may send usage information (e.g., activation of guest virtual machine 107) to life cycle manager 301 which may record information regarding usage of guest virtual machine 107. Further, use control agent 321b may handle signals to shut down guest virtual machine 107 from life cycle manager 301 when the life cycle manager 301 detects a policy violation associated with guest virtual machine 107.

In some implementations, life cycle agent 321 may include an encryption engine 321c, which may encrypt or decrypt data based on instructions from life cycle manager 301, which may be based on an assigned encryption policy 309e.

In some implementations, life cycle agent 321 may include a local integrity module 321d. Local integrity module 321d may provide integrity information to virtual machine integrity module 307. Integrity information may comprise, for example, a checksum associated with guest virtual machine 107, a checksum associated with one or more files associated with guest virtual machine 107, configuration information, whether a file exists, a user list, and so forth. Virtual machine integrity module 307 may compare the integrity information against an approved snapshot associated with guest virtual machine 107. If deviations between the integrity information and the snapshot are detected, the virtual machine integrity module 307 may control the local integrity module 321d to take a remedial action (e.g., restore guest virtual machine 107 to a prior state, shut down guest virtual machine 107).

In some implementations, life cycle agent 321 may include an access control agent 321e, which may enforce security policies. For example, as security policies (e.g., a security policy 309c) may define what data is classified as sensitive data (and/or gradations of sensitive data) on guest virtual machine 107, who can access sensitive data, through which channels sensitive data can be accessed, and/or other instructions or parameters, access control agent 321e may utilize a security policy applied to guest virtual machine 107 to determine whether to grant access to data when presented with certain access attempts.

Guest virtual machine 107 may also include a virtualization platform manager 323. Virtualization platform manger 323 may store information describing cloud environment 101. For example, virtualization platform manager 323 may contain information identifying other guest virtual machines within cloud environment 101. Additionally, virtualization platform manager 323 may be able to receive information describing events associated with other guest virtual machines 107 such as a new guest virtual machine starting up, a guest virtual machine moving, a guest virtual machine being removed from the system, and so forth.

Figure 2:
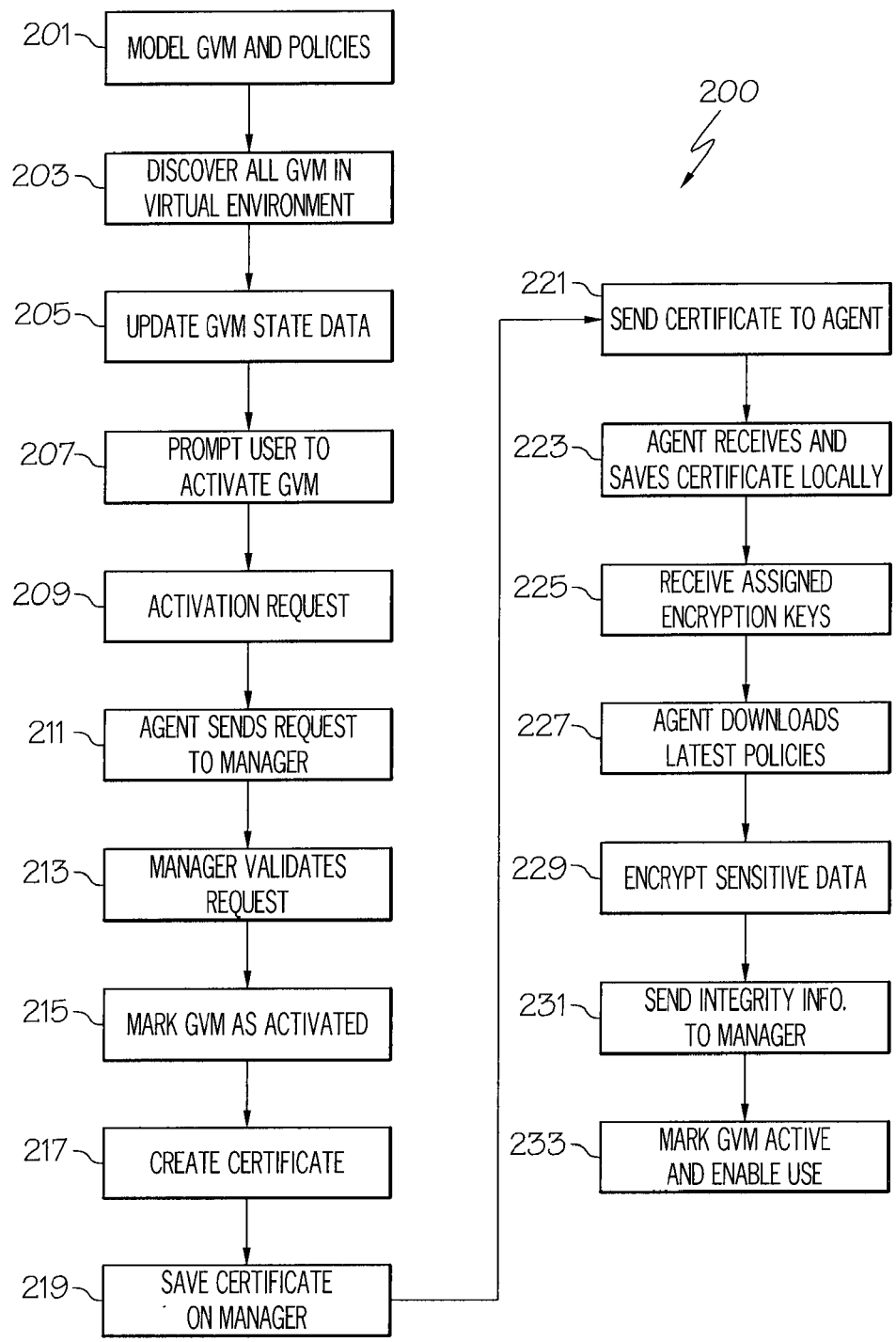
FIG. 2 is an illustration of an example process for providing enforcement of security controls in a cloud computing environment throughout virtual machine life cycle state changes, according to various implementations.

FIG. 2 illustrates a process 200, which is an example of a process for providing security controls on a virtual machine in a virtual computing environment. Use of the virtual machine life cycle management components herein may begin with an administrator modeling and/or editing the desired virtualization environment, its various policies (e.g., usage policies 309a, integrity policies 309b, security policies 309c, repair policies 309d, encryption policies 309e, snapshot policies 309f, and/or other policies in the policy model 303a) and or other components in an operation 201. The modeled or edited policies may be saved in policy store 309 of life cycle manager 301.

In an operation 203, virtual machine discovery module 313 may find guest virtual machines in cloud environment 101 and save their properties and state (e.g., in data store 311 of life cycle manager 301).

In an operation 205, state control module 305a may obtain any updated states stored in data store 311. Further, based on policies stored in policy store 309, state control module 305a may decide whether a guest virtual machine in cloud environment 101 requires life cycle agent 321 installed thereon or not. For example, in some instances a guest virtual machine may not need to have a life cycle agent 321 installed thereon because a life cycle agent 321 is already installed thereon. However, in some instances, a given guest virtual machine may not require a life cycle agent 321 installed thereon. For example, a test virtual machine may not require protection important for other virtual machines. If state control module 305a decides that a given guest virtual machine 107 requires a life cycle agent 321, state control module 305a may deploy life cycle agent 321 onto guest virtual machine 107 using agent deployment module 303b.

When a guest virtual machine 107 is used the first time by an authorized user in an operation 207, use control agent 321b may prompt the user (e.g., via a display at a user device 103) to activate guest virtual machine 107 by entering a password, secret key, and/or other identifier. In an operation 209, use control agent 321b may then send an activation request, together with the entered password, secret key, and/or other identifier, to agent communicator 315, which will move the activation request to activation control module 305b in an operation 211. In an operation 213, activation control module 305b may validate that activation of guest virtual machine 107 is allowed by checking virtual machine usage policies 309a. For example, as usage policies 309a dictate whether guest virtual machine 107 can be active and how many copies of guest virtual machine 107 are allowed to exist, and/or other usage related policies, activation control module 305b may be able to determine whether to validate the activation request based on a usage policy 309a associated with guest virtual machine 107.

If activation is allowed, activation control module 305b may mark guest virtual machine 107 as activated in data store 311 in an operation 215, create a certificate for guest virtual machine 107 in an operation 217, save the certificate in data store 311 (e.g., as a certificate 311c) in an operation 219, and send the certificate to the life cycle agent 321 of guest virtual machine 107 through agent communicator 315 in an operation 421.

In an operation 223, use control agent 321b may receive a copy of the certificate from life cycle manager 301 and save it locally. Use control agent 321b may also receive any assigned encryption keys from life cycle manager 301 in operation 223. In some implementations, the encryption keys may be renewed on every startup (i.e., they may not be saved locally).

After guest virtual machine 107 is activated, life cycle agent 321 may download the latest security policies 309c from life cycle manager 301 in an operation 225 using policy fetcher 321a. These security policies 309c may contain information about which resources should be protected, which resources should be monitored for integrity change, which resources should be encrypted, and/or other security-related information. Based on these security policies 309c, life cycle agent 321 may begin protecting sensitive data using access control agent 321e in an operation 227. In some implementations, life cycle agent 321 may also begin sending integrity information relating to guest virtual machine 107 using local integrity module 321d in an operation 229. In some implementations, life cycle agent 321 may also encrypt sensitive data using encryption engine 321c in an operation 231. Data may be encrypted using the encryption keys received from life cycle manager 301 during startup of guest virtual machine 107 and may be encrypted according to appropriate encryption policies 309e. Guest virtual machine 107 may now be marked as activated in an operation 233 and may be available for use by an authorized user.

Integrity monitor 307a may monitor guest virtual machine 107 to determine whether guest virtual machine 107 is tampered with (e.g. sensitive data was not changed and new processes were not installed on image). Integrity monitor 307a may do this by checking that properties of guest virtual machine 107, signatures associated with guest virtual machine, specific policies deployed to guest virtual machine 107, and/or running processes on guest virtual machine 107 match those defined by the integrity policies 309b and/or the security policies 309c.

Virtual machine discovery module 313 may monitor the activity and state of guest virtual machine 107 in cloud environment 101. This monitoring may include determining whether guest virtual machine 107 is running and whether guest virtual machine 107 has been moved to a different location. This monitored information may be stored in data store 311 (specifically, virtual machine state information store 311b). In some implementations, activation control module 305b may validate that running images are marked as activated in the virtual machine stat information store 311b.

In some implementations, encryption engine 321c of life cycle agent 321 may monitor the local system of guest virtual machine 107 to ensure the encryption of files and directories that are identified by encryption policies 309e associated with guest virtual machine 107.

As described herein, the systems and methods provided may enable security enforcement through state or life cycle changes for guest virtual machines in a cloud environment. This may include state changes related to image tampering. For example, integrity monitor 307a of life cycle manager 301 may identify a change in the properties or security policy level of guest virtual machine 107 that does not match the integrity policies 309b or security policies 309c assigned to guest virtual machine 107. In this instance, integrity monitor 307a may trigger integrity resolver 307b to repair the discovered deviations. Integrity resolver 307b may act according the appropriate repair policies 309d to fix deviations by either automatically fixing deviations (e.g., rolling back guest virtual machine 107 to a previously saved state that is captured on a stored snapshot of guest virtual machine 107) or by modifying virtual machine data 311a stored for guest virtual machine 107 to match integrity policies. In one example of a non-automatic option for resolving integrity deviations, guest virtual machine 107 may be put into an "out of sync" state. In an "out of sync" state, ports of guest virtual machine 107 that are not used for communication with life cycle manager 301 may be closed. An authorized user of guest virtual machine 107 may then be asked to approve changes and/or to allow life cycle manager 301 to resolve discrepancies. After guest virtual machine 107 is repaired, it may be returned to an "active state" and network ports may be reopened for communication.

Other state changes may relate to use control on guest virtual machine 107. For example, activation control module 305b may identify a violation between guest virtual machine 107's reported state and the state for guest virtual machine 107 in virtual machine state information store 311b. For example, the state reported by guest virtual machine 107 may be "inactive" and the state stored by life cycle manager 301 may be "active." In another instance, there may be a violation between a reported state of guest virtual machine 107 and virtual machine usage policies 309a applied to guest virtual machine 107. An example violation may include, for example, when a copy of guest virtual machine 107 is detected as operating even though guest virtual machine 107 has been marked as "disposed" according to its applied usage policy 309a. Another example may include running multiple image copies of guest virtual machine 107 that is limited in its applied usage policies 309a to one instance. Use control information may be provided to life cycle manager 301 by use control agent 321b. Further, after identifying a use control violation, activation control module 305b may instruct use control agent 321b to shut down unauthorized images running.

Still other state change scenarios may involve cloud provider initiated status change. For example, activation control module 305b may be notified by a cloud provider system of cloud environment 101 that the state of guest virtual machine 107 needs to be changed to, for example, a disposed state, a locked state, an unlocked state, and so forth. The cloud provider system may notify use control agent 321b of life cycle agent 321 with the new status (which may shutdown guest virtual machine 107, if needed). The new status may then be saved in virtual machine state information data store 311b.

The systems and methods described herein may be used during different use case scenarios involving guest virtual images in a cloud computing environment (e.g., cloud environment 101). For example, during an image activation sequence, a customer/user may order a guest virtual machine 107 using an ordering interface of a provider of cloud environment 101. Specific security features may be chosen when ordering guest virtual machine 107 that implicate the security features and functions described herein. The cloud provider system may instantiate guest virtual machine 107 according to the request and a life cycle agent 321 may be installed onto guest virtual machine 107. The life cycle agent 321 may download a local security policy 309c from the life cycle monitor 301 of cloud environment 301. Furthermore, one or more integrity signatures may be sent from life cycle agent 321 to life cycle monitor 321. Integrity signatures may include, for example, a virtual machine checksum, a checksum of a file, a list of users, and so forth. At various points during the life cycle of guest virtual machine 107, integrity signatures may be provided to integrity monitor 307a in order to validate the integrity of guest virtual machine 107.

When a user first logs onto guest virtual machine 107, the user may be prompted for authentication credentials prior to the activation of guest virtual machine 107. In some implementations the user may be prompted for authentication credentials upon ordering the system of the cloud provider once guest virtual machine 107 is ready for use. As described herein, during activation of guest virtual machine 107, a certificate may be provided for guest virtual machine 107 from the activation control module 305b of life cycle manager 301. The certificate may also be stored by life cycle manager 301 in data store 311 (e.g., as certificate data 311c). Activation control module 305b may also assign an active state to guest virtual machine 107.

While guest virtual machine 107 is not in an active and protected state, the virtual machine discovery module 313 may monitor guest virtual machine 107 to make sure protections are put into place when guest virtual machine 107 becomes active. Specifically, virtual machine discovery module 313 will seek to ensure a life cycle agent 321 is installed into guest virtual machine 107 when guest virtual machine 107 becomes active. At this point, the life cycle agent may facilitate the detection of any inconsistencies that may have arisen during guest virtual machine 107's downtime. For example, if a security policy associated with guest virtual machine 107 has been tampered with, life cycle agent can promptly seek to correct the inconsistency by, for example, restoring a tampered file to a previous state, shutting down guest virtual machine 107, and so forth.

The systems and methods provided herein may also operate in the event of an image theft attempt. For example, a user of guest virtual machine 107 may have "cloning" access to guest virtual machine 107 which may allow the user to create a copy of guest virtual machine 107. Accordingly, the user may clone guest virtual machine 107 into the user's own private environment (e.g., the user's personal physical machine or other environment) and try to start the image in that private environment. When the cloned guest virtual machine 107 starts, and finds itself active, but does not find a connection to life cycle manager 301, the cloned guest virtual machine may shut itself down to prevent unauthorized start. This self-shutdown may be initiated by use control agent 321*b*. Even if a component similar to life cycle manager 301 exists on the private environment, if the certificate sent by the component does not match, the image initiation may be prevented. Thus, if the user were an attacker trying to directly access to guest virtual machine 107 or its sensitive data the data access may be prevented. Accordingly, communications between life cycle manager 310 and life cycle agent 321 may provide sensitive disk data protection.

The systems and methods provided herein may also protect against virtual machine impersonation scenarios. For example, a user with access to guest virtual machine 107 may replace guest virtual machine 107 with a virtual machine that "looks" similar to guest virtual machine 107 but includes a malware program designed to send sensitive data relating to guest virtual machine 107 or another part of cloud environment 101 to a private image or other environment. When the owner of the authentic guest virtual machine 107 starts up guest virtual machine 107, life cycle manager 301 may find the imposter virtual machine running without a life cycle agent 321. Further, even if the imposter image has a life cycle agent or equivalent module, the stored certificate may not match the certificate stored by life cycle manager 301 for the authentic guest virtual machine 107. In either case, life cycle manager 301 may prevent the imposter virtual machine from running on the cloud environment 101 as a result of the missing life cycle agent or improper certification.

The systems and methods provided herein may also be used to authenticate virtual machine copies. For example, an owner/user of a guest virtual machine 107 may create a copy of guest virtual machine 107 and may subsequently want to run the copy. Because the certificate may be duplicated as well, the copy may not be able to run due to the certificate already being in use by the original guest virtual machine 107. However, the user can re-authenticate the copy and request a new certificate for the copy. The copy image may then be put through the activation scenario described above so that its security policies 309*c* and signatures may be verified. The copy virtual machine may then be provided its own unique certificate and as a result, the user will have an additional monitored secured virtual machine in cloud environment 101.

The systems and methods provided herein may also protect against unauthorized image copies. For example, an administrator on cloud environment 101 may create a copy of guest virtual machine 107 and may want to run the copy. The copy may be prevented from operating in a different environment because, as described above, the life cycle agent on the copy may not find a corresponding life cycle manager 301 on the environment. An attempt to run the copy on cloud environment 101 may also fail because the virtual machine usage policies 309*a* associated with the original guest virtual machine 107 may not allow copies or parallel virtual machines to run. If the copy attempts to run, an alert may be generated and the original guest virtual machine 107, in addition to the copy, may be shut down.

The systems and methods provided herein may also protect against tamper attempts directed at a guest virtual machine 107. For example, if an attacker uses a security weakness on the native OS of 107 and creates a back door, "Trojan horse", or other security breach inside guest virtual machine 107, when life cycle agent 321 of guest virtual machine 107 next sends signatures to life cycle manager 301, integrity monitor 307*a* of life cycle manager 301 may detect the signature change. As a result, life cycle manager 301 may set an "out of sync" state for guest virtual machine 107 and an alert may be raised. The owner of guest virtual machine 107 may then select a self-healing option to restore guest virtual machine 107 to a secured state. Self-healing options may include, for example, reverting guest virtual machine 107 to a prior snapshot, overwriting a file with a previously saved copy of the file, overwriting a registry with a previously saved version of the registry, and so forth. In the meantime, according to guest virtual machine 107's associated integrity policy 309*b*, use of guest virtual machine 107 may be blocked until its signatures and policies are back in sync. If guest virtual machine 107 cannot be self-healed (e.g., because of too many changes), life cycle manager may use stored virtual machine data 311*a* associated with guest virtual machine 107 to restore it back to previous state which is secure.

The systems and methods provided herein may also provide for authorized movement of guest virtual machines between virtualization environments. For example, a user may allow their guest virtual machine 107 to be transferred to, for example, a trusted backup host. This fact may be sent from the local life cycle agent 321 to the life cycle manager 301, which may note permissive move information in data store 311 (e.g., through a policy update). When guest virtual machine 107 is moved to the trusted backup host, life cycle agent 321 may connect to life cycle manager 301, which may verify that guest virtual machine 107 no longer runs on the old host (e.g., so attacker cannot start it on a trusted host while it is still in use on the original host). The current location of guest virtual machine 107 may be updated on its life cycle agent 321 allowing guest virtual machine 107 to run on the new host (now it can no longer run on the original host unless it is safely moved back.

The systems and methods provided herein may also provide for prevention of unauthorized "break-ins" to an active guest virtual machine. For example, direct break-in attempts to a running guest virtual machine 107 may fail because of local security policies 309*c* maintained on guest virtual machine 107 (e.g., user authentication credentials). Further, these break-in attempts may also be reported to life cycle manager 301. Attempts to copy guest virtual machine 107 to a different environment may fail because of protections described above.

The systems and methods provided herein may also provide for end of image activation for guest virtual machines. For example, a guest virtual machine 107 may be monitored by life cycle manager 301 while in an "active" state. When not being used (e.g., when a user is not currently making use of the guest virtual machine 107 but still intends to at a later point in time), guest virtual machine 107 may be locked and then unlocked when use is requested once again. When guest virtual machine 107 is no longer needed, its user may mark it for disposal. This information may then be sent to life cycle manager 301 by life cycle agent 321 on guest virtual machine 107. Accordingly, the state of guest virtual machine 107 may be changed to "disposed" and as a result, further activation of guest virtual machine 107 may be prohibited. During the "disposed" state disk data encryption may prevent direct access to guest virtual machine 107's data. Further, an alert may be raised on life cycle manager 301 if guest virtual machine 107 is not marked as disposed. If guest virtual machine 107 is ever reactivated, (e.g., from an old clone), life cycle manager 301 may prevent activation of the clone.

In some implementations, the systems and methods provided herein may provide for agentless security deployment for offline virtual machines which may compliment run-time protection. This agentless deployment enables security protection in spite of gaps in other security or protection schemes. For example, a guest virtual machine 107 that is added to a virtualization environment (e.g., cloud environment 101) may not have updated policies (e.g., security policies, etc.). In some instances, security components (e.g., security agents such as, for example, life cycle agent 321) may not even be present on the new guest virtual machine 107. Accordingly, the guest virtual machine 107 may not be secure. This may leave a window of vulnerability for attacks on guest virtual machine 107 until startup procedures can be finished and policies and other components can be properly installed or updated. A further example of a security gap is the case where security components are removed from a guest virtual machine 107 in a cloud environment 101 (e.g., on system startup). In this case, on the next restart of guest virtual machine 107, guest virtual machine 107 may no longer be protected with the necessary security components and up to date policies. An additional example may occur when a restored or inactive guest virtual machine 107 (e.g., a guest virtual machine 107 that is retrieved from an old backup or snapshot) are running without proper or up to date policies or other security components. In another example, deployment of policies to guest virtual machine 107 in a virtualization environment can fail if guest virtual machine 107 is not running with current security components or if guest virtual machine 107 is in a state that does not allow deployment at the moment (e.g., because it is shutdown). There may be a further security risk if deployment fails on guest virtual machine 107.

To address these security gaps, a dynamic and automatic update of guest virtual machine 107 data may be employed so as to add or update security components and updated policies into guest virtual machine 107 while it is still offline or when starting up or shutting down. This may be done to ensure that a guest virtual machine 107 running on a secured environment is compliant with current policies set for it. Even if guest virtual machine 107 has no policies on it during setup, or security components and/or policies were removed while it was running, the next startup may automatically restore the policies.

In some implementations, the virtual environment may include a controller virtual machine (e.g., virtual appliance machine 109 or other component of the virtual environment) that mounts guest virtual machine data and scans its persistent storage to determine the current state of the guest virtual machine 107's policies and/or other security components. If needed, the content (e.g., policies and/or other security components) of the guest virtual machine data may be modified by the controller virtual machine to inject the up-to-date policies or security components to the proper place on the guest virtual machine 107's storage. In some implementations, the controller virtual machine may also modify guest virtual machine 107 so that the next startup will run a onetime process to install the software on guest virtual machine 107's disk from the storage location it was saved to (in case a security component needs some setup that depends on the guest virtual machine environment and updating the guest virtual machine 107's disk data is not enough).

In some implementations a trigger may be used to cause the controller virtual machine to initiate update or other actions. For example, upon discovery of a new guest virtual machine 107 (e.g., due to creation or migration), guest virtual machine 107 may be scanned and proper software components may be deployed on it according to a policy associated with guest virtual machine 107.

Other triggers may include the shutdown of guest virtual machine 107, the startup of guest virtual machine 107, and reversion to a snapshot\backup of guest virtual machine 107. In these instances, before allowing guest virtual machine 107 to become accessible, the controller virtual machine may perform an integrity check to determine any missing, corrupted, or out of date policies or other security components. In the event of a mismatch between an expected policy or other security component and the current one, the necessary corrective actions will be performed by the controller virtual machine (e.g., missing or corrupted software components will be re-deployed).

As described herein, the controller virtual machine may detect a guest virtual machine 107 added to the environment and may deploy policies or other security components while guest virtual machine 107 is still offline and before guest virtual machine 107's first startup on the environment. Additionally, when guest virtual machine 107 restarts and before guest virtual machine 107 becomes available for use, integrity of guest virtual machine 107 may be verified, so if a policy or other security component is missing, it will be restored to ensure guest virtual machine 107 is protected before guest virtual machine 107 is available for access by users. When reverting to an old snapshot or backup, the controller virtual machine may control the startup process of guest virtual machine 107 and install up-to-date policies and/or other security components onto guest virtual machine 107.

As described herein the controller virtual machine may automatically ensure the presence of active and up-to-date policies and/or security components on guest virtual machine 107 in a virtualization environment without the need to shutdown guest virtual machine 107, so enforcement of security management and controls may be guaranteed on guest virtual machine 107, even without explicit installation procedures on guest virtual machine 107 during setup time and without the need for a user or owner of guest virtual machine 107 to be involved.

Accordingly, the systems and methods described herein may eliminate a window of opportunity to install malware or other security breach when guest virtual machine 107 starts up. As such, there may be no more need to manually update or install policies when guest virtual machine 107 starts up. Furthermore, policies may be up to date and running when guest virtual machine 107 powers on. Additionally, security deployment may be transparent to users of guest virtual machine 107 because the installation and update tasks may be done while guest virtual machine 107 is powered off. Accordingly, there may be no need for a user to remember to setup security controls on guest virtual machine 107. The systems and methods described herein may provide security deployment that can cover guest virtual machines in a virtualization infrastructure, including machines that are currently down, or even unavailable to the virtualization infrastructure. The systems and methods described herein may also provide continual security coverage even when a security component (e.g., agent) has been deliberately or inadvertently removed from a protected guest virtual machine 107 because, for example, the component may be automatically restored to guest virtual machine 107 during its next power up. As such, agentless security deployment may be provided because there is no need for a deployment agent to download security components as any needed components may be automatically installed on guest virtual machine 107 during its first and subsequent power-ons. Automatic deployment of security components when a guest virtual machine is offline, or during guest virtual machine startup before any login to the system is possible, may also be provided for by systems and methods described herein.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A computer program product comprising:
a non-transitory computer readable storage medium having computer readable program code embodied therewith, the computer readable program code comprising:
computer readable program code configured to instantiate a guest virtual machine in a virtual computing environment;
computer readable program code configured to install a life cycle agent on the guest virtual machine;
computer readable program code configured to assign a certificate that identifies the virtual machine, a set of policies, and an encryption key to the guest virtual machine; and
computer readable program code configured to provide the identifying certificate, the set of policies, and the encryption key to the guest virtual machine for use of the identifying certificate, the set of policies or the encryption key, in conjunction with the life cycle agent.

2. The computer program product of claim 1, further comprising:
computer readable program code configured to detect an event associated with the guest virtual machine; and
computer readable program code configured to provide an authorization signal to the guest virtual machine, where the authorization signal controls the guest virtual machine to perform an action.

3. The computer program product of claim 2, where the event is a modification of data associated with the guest virtual machine, a modification of a policy associated with the guest virtual machine, an activation of the guest virtual machine, a signal received from the guest virtual machine, a modification of a state of the guest virtual machine, or a determination that integrity of the guest virtual machine has been compromised.

4. The computer program product of claim 2, where the action is permitting modification of data associated with the detected event, permitting modification of a program associated with the detected event to occur, permitting modification of a policy associated with the detected event, changing a state of the guest virtual machine, shutting down the guest virtual machine, restoring data to a previous state, restoring a policy to a previous state, or restoring the guest virtual machine to a previous state.

5. The computer program product of claim 2, where the computer readable program code configured to detect the event is further configured to receive a signal describing the event from the guest virtual machine.

6. The computer program product of claim 2, further comprising computer readable program code configured to generate a report describing the event.

7. The computer program product of claim 1, where the set of policies comprises a usage policy that indicates usage parameters for the guest virtual machine, an integrity policy that indicates integrity parameters for the guest virtual machine, a security policy that indicates data security parameters for the guest virtual machine, a repair policy that indicates repair parameters for the guest virtual machine, an encryption policy that indicates data encryption parameters for the guest virtual machine, or a snapshot policy that dictates backup parameters for the guest virtual machine.

8. The computer program product of claim 1, where the identifying certificate, the set of policies, and the encryption key are stored by the life cycle agent.

9. The computer program product of claim 8, where the identifying certificate, the set of policies, or the encryption key is used by the life cycle agent to authenticate the guest virtual machine within the virtual computing environment, and where the identifying certificate, the set of policies, or the encryption key is used by the life cycle agent to monitor integrity of the guest virtual machine.

10. The computer program product of claim 1, further comprising computer readable program code configured to put the guest virtual machine in a locked state and to prevent use of the guest virtual machine.

11. The computer program product of claim 1, further comprising computer readable program code configured to monitor movement of the guest virtual machine from the virtual computing environment to another environment.

12. The computer program product of claim 11, wherein the computer readable program code configured to monitor movement of the guest virtual machine is configured to prevent movement of the guest virtual machine from the virtual computing environment to another environment or to allow movement of the guest virtual machine from the virtual computing environment to another authorized environment.

13. The computer program product of claim 1, further comprising computer readable program code configured to identify or allow a clone of the guest virtual machine.

14. The computer program product of claim 13, wherein the computer readable program code configured to identify or allow a clone of the guest virtual machine is further configured to prevent concurrent running of the guest virtual machine and the clone of the guest virtual machine.

15. The computer program product of claim 1, wherein life cycle agent is configured to encrypt data of the guest virtual machine.

16. The computer program product of claim 1, further comprising computer readable program code configured to put the guest virtual machine in an out of sync state if there is a violation of the integrity of the guest virtual machine, the life cycle agent is missing from the guest virtual machine or there is a deviation in a policy associated with the guest virtual machine, and to correct an inconsistency of the guest virtual machine or revert the guest virtual machine to a previous state.

17. The computer program product of claim 1, further comprising computer readable program code configured to put the virtual machine in a disposed state and to prevent activation of the virtual machine.

18. A system, comprising:
a policy data store, comprising hardware, to store policies associated with a guest virtual machine operating in a virtual computing environment;
an agent deployment module to deploy a life cycle agent to a guest virtual machine;
a policy deployment module to transmit a set of the policies to the life cycle agent; and
a life cycle engine module to monitor state changes associated with the guest virtual machine based on the policies, and to take remedial action upon detecting an unauthorized state change.

19. The system of claim 18, further comprising an audit module to generate audit data in response to a remedial action taken by the life cycle engine module.

20. The system of claim 19, further comprising a report module to generate a report describing a status of the virtual computing environment based, at least in part, on the audit data.

21. The system of claim 18, further comprising an agent communicator to route signals between the life cycle agent and modules of the system.

22. The system of claim 18, further comprising a virtual machine integrity module to detect integrity of the guest virtual machine based on the policies, and to take remedial action upon detecting that integrity of the guest virtual machine has been compromised.

23. The system of claim 18, further comprising a virtual machine data store to store signatures of sensitive data on the guest virtual machine, a list of programs that are authorized to run on the guest virtual machine, data used for integrity checks of the guest virtual machine, data used for repairing the guest virtual machine, data used for restoring the guest virtual machine to a prior state, data describing a state of the guest virtual machine, certificate data associated with the guest virtual machine, or a snapshot of the guest virtual machine.

24. The system of claim 18, where the remedial action taken by the life cycle agent comprises initiating a state change in the guest virtual machine, controlling the guest virtual machine to shut down, or restoring the guest virtual machine to a previous state.

25. A system, comprising:
a policy data store, comprising hardware, to store policies associated with a guest virtual machine operating in a virtual computing environment;
an agent deployment module to deploy a life cycle agent to a guest virtual machine;
a policy deployment module to transmit a set of the policies to the life cycle agent; and
a virtual machine integrity module to detect integrity of the guest virtual machine based on the policies, and to take remedial action upon detecting that integrity of the guest virtual machine has been compromised.

26. The system of claim 25, further comprising an audit module to generate audit data in response to a remedial action taken by the virtual machine integrity module.

27. The system of claim 25, where detection that integrity of the guest virtual machine has been compromised comprises comparing data received from the life cycle agent to a policy associated with the guest virtual machine.

28. The system of claim 25, where detection that integrity of the guest virtual machine has been compromised comprises comparing a checksum associated with data on the guest virtual machine received from the life cycle agent to a checksum stored in a virtual machine data store.

29. The system of claim 25, where the remedial action taken by the virtual machine integrity module comprises restoring data on the guest virtual machine to a previous state, restoring a policy on the guest virtual machine to a previous state, or restoring the guest virtual machine to a previous state.

30. A method comprising:
instantiating a guest virtual machine in a virtual computing environment;
installing a life cycle agent on the guest virtual machine;
assigning a certificate that identifies the virtual machine, a set of policies, and an encryption key to the guest virtual machine; and
providing the identifying certificate, the set of policies, and the encryption key to the guest virtual machine for use of the identifying certificate, the set of policies or the encryption key, in conjunction with the life cycle agent.

31. The method of claim 30, further comprising:
detecting an event associated with the guest virtual machine; and
providing an authorization signal to the guest virtual machine, where the authorization signal controls the guest virtual machine to perform an action.

32. The method of claim 31, where the event is a modification of data associated with the guest virtual machine, a modification of a policy associated with the guest virtual machine, an activation of the guest virtual machine, a signal received from the guest virtual machine, a modification of a state of the guest virtual machine, or a determination that integrity of the guest virtual machine has been compromised.

33. The method of claim 31, where the action is permitting modification of data associated with the detected event, permitting modification of a program associated with the detected event to occur, permitting modification of a policy associated with the detected event, changing a state of the guest virtual machine, shutting down the guest virtual machine, restoring data to a previous state, restoring a policy to a previous state, or restoring the guest virtual machine to a previous state.

34. The method of claim 31, where detecting the event further comprises receiving a signal describing the event from the guest virtual machine.

35. The method of claim 31, further comprising generating a report describing the event.

36. The method of claim 30, where the set of policies comprises a usage policy that indicates usage parameters for the guest virtual machine, an integrity policy that indicates integrity parameters for the guest virtual machine, a security policy that indicates data security parameters for the guest virtual machine, a repair policy that indicates repair parameters for the guest virtual machine, an encryption policy that indicates data encryption parameters for the guest virtual machine, or a snapshot policy that dictates backup parameters for the guest virtual machine.

37. The method of claim 30, where the identifying certificate, the set of policies, and the encryption key are stored by the life cycle agent.

38. The method of claim 37, where the identifying certificate, the set of policies, or the encryption key is used by the life cycle agent to authenticate the guest virtual machine within the virtual computing environment, and where the identifying certificate, the set of policies, or the encryption key is used by the life cycle agent to monitor integrity of the guest virtual machine.

* * * * *